(12) United States Patent
Ye et al.

(10) Patent No.: US 8,842,826 B2
(45) Date of Patent: Sep. 23, 2014

(54) INFORMATION-THEORETICALLY SECURE SECRECY GENERATION

(75) Inventors: Chunxuan Ye, King of Prussia, PA (US); Alexander Reznik, Titusville, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 852 days.

(21) Appl. No.: 12/464,236

(22) Filed: May 12, 2009

(65) Prior Publication Data

US 2009/0279700 A1 Nov. 12, 2009

Related U.S. Application Data

(60) Provisional application No. 61/052,333, filed on May 12, 2008.

(51) Int. Cl.
*H04L 9/00* (2006.01)
*H04L 9/08* (2006.01)

(52) U.S. Cl.
CPC ........... *H04L 9/0875* (2013.01); *H04L 2209/80* (2013.01)
USPC .................. 380/44; 380/46; 380/47; 380/270

(58) Field of Classification Search
CPC ........................ H04L 9/0875; H04L 2209/80
USPC ............. 380/44–47, 255, 259, 260, 263, 268, 380/270
See application file for complete search history.

(56) References Cited

U.S. PATENT DOCUMENTS 7,191,466 B1 3/2007 Hamid et al.

| | | |
|---|---|---|
| 8,090,101 B2 * | 1/2012 | Ye et al. ........................... 380/47 |
| 2006/0161791 A1 | 7/2006 | Bennett |
| 2007/0058808 A1 * | 3/2007 | Rudolf et al. .................. 380/44 |

(Continued)

FOREIGN PATENT DOCUMENTS

| CN | 1808972 | 7/2006 |
|---|---|---|
| JP | H10-513317 | 12/1998 |

(Continued)

OTHER PUBLICATIONS

Charles H. Bennett et al., "Generalized Privacy Amplification", IEEE Transactions on Information Theory, vol. 41, No. 6, pp. 1915-1923, (Nov. 1995).

(Continued)

*Primary Examiner* — Tae Kim
(74) *Attorney, Agent, or Firm* — Baker & Hostetler LLP

(57) ABSTRACT

A method and apparatus are provided for performing information-theoretically secure cryptography using joint randomness not shared by others. Two valid communicating entities independently generate samples of a shared source that is not available to an illegitimate entity. The shared source may be a satellite signal, and each legitimate entity may generate uniformly distributed samples from a binary phase-shift keying signal received on an independent channel. Alternatively, the shared source may be a channel between the two legitimate entities, such that each legitimate entity generates samples of unknown distribution based on the channel impulse response of the channel. One legitimate entity generates an encryption key, a quantization error, and a syndrome from its samples. The quantization error and the syndrome are reported to the other legitimate entity. The other legitimate entity generates a matching encryption key using its samples, the quantization error, and the syndrome.

36 Claims, 7 Drawing Sheets

(56) References Cited

U.S. PATENT DOCUMENTS

| | | | |
|---|---|---|---|
| 2007/0165845 A1* | 7/2007 | Ye et al. | 380/30 |
| 2007/0177729 A1* | 8/2007 | Reznik et al. | 380/44 |
| 2008/0089518 A1* | 4/2008 | Reznik et al. | 380/268 |
| 2008/0123851 A1* | 5/2008 | Guccione et al. | 380/270 |
| 2008/0304658 A1* | 12/2008 | Yuda et al. | 380/44 |

FOREIGN PATENT DOCUMENTS

| | | |
|---|---|---|
| JP | 2008-529413 | 7/2008 |
| JP | 2010-507276 | 3/2010 |
| TW | 574642 | 2/2004 |
| WO | WO 96/23376 | 8/1996 |
| WO | WO 2006/081122 | 8/2006 |
| WO | WO 2008/010838 | 1/2008 |

OTHER PUBLICATIONS

Lan Man Standards Committee of the IEEE Computer Society, Information Technology—Telecommunications and Information Exchange Between Systems—Local and Metropolitan Area Networks—Specific Requirements—Part 11: Wireless LAN Medium Access Control (MAC) and Physical Layer (PHY) Specifications, ANSI/IEEE Std 802.11, 1999 Edition.

Rudolf Ahlswede et al., "Common Randomness In Information Theory and Cryptography—Part I: Secret Sharing", IEEE Transactions on Information Theory, vol. 39, No. 4, pp. 1121-1132, (Jul. 1993).

Third Generation Partnership Project, "Technical Specification Group Radio Access Network; Multiplexing And Channel Coding (FDD) (Release 7)", 3GPP TS 25.212 V7.7.0 (Nov. 2007).

Third Generation Partnership Project, "Technical Specification Group Radio Access Network; Multiplexing And Channel Coding (FDD) (Release 7)", 3GPP TS 25.212 V7.10.0 (Mar. 2009).

Third Generation Partnership Project, "Technical Specification Group Radio Access Network; Multiplexing And Channel Coding (FDD) (Release 8)", 3GPP TS 25.212 V8.1.0 (Mar. 2008).

Third Generation Partnership Project, "Technical Specification Group Radio Access Network; Multiplexing And Channel Coding (FDD) (Release 8)", 3GPP TS 25.212 V8.5.0 (Mar. 2009).

Third Generation Partnership Project, "Technical Specification Group Radio Access Network; Multiplexing And Channel Coding (FDD) (Release 6)", 3GPP TS 25.212 V6.5.0 (Jun. 2005).

Third Generation Partnership Project, "Technical Specification Group Radio Access Network; Multiplexing And Channel Coding (FDD) (Release 6)", 3GPP TS 25.212 V6.10.0 (Dec. 2006).

Ueli M. Mauer, "Secret Key Agreement by Public Discussion From Common Information", IEEE Transactions On Information Theory, vol. 39, pp. 733-742, (May 1993).

Ye et al., "Extracting Secrecy From Jointly Gaussian Random Variables", Proceeding International Symposium of Information Theory, pp. 2593-2597, (Jul. 2006).

Ye et al., "On The Secrecy Capabilities of ITU Channels", Proceedings Vehicular Technology Conference, (Fall 2007).

Ye et al., "Secret key and private key constructions for simple multiterminal source models," Information Theory, ISIT 2005, IEEE Proceedings, Sep. 2005, pp. 2133-2137.

Ye et al., "Information—theoretically Secret Key Generation for Fading Wireless Channels," [online], Oct. 29, 2009, [retrieved on Jan. 16, 2013], Internet <URL: http://arxiv.org/abs/0910.5027>, 35 pages.

* cited by examiner

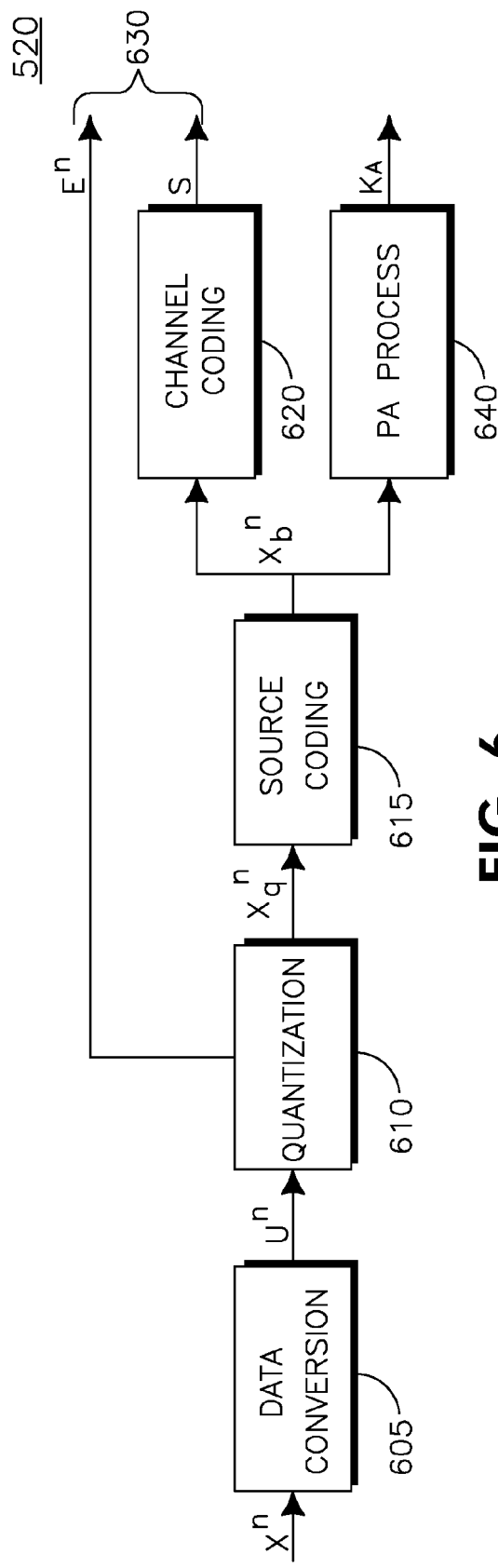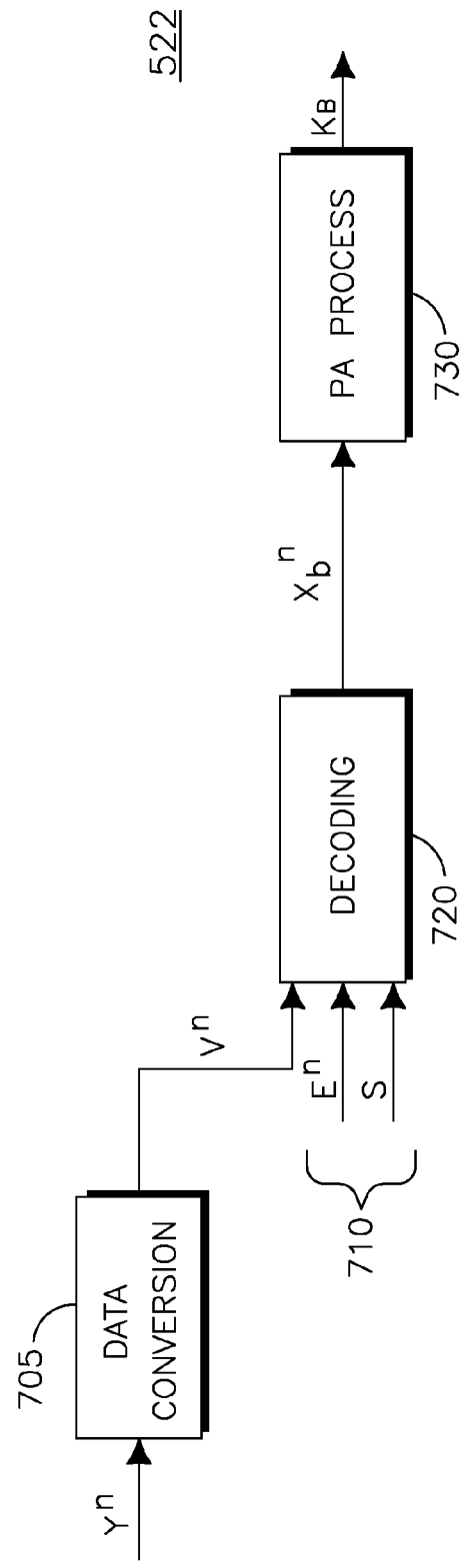

```
FOR i = 1 TO v
        L_i ← 2E−2V + 1−2^{−(v−i+1)};
        IF V < 0.5
                V ← 2V;
                E ← 2E;
        ELSE
                V ← 1−2V;
                E ← 2^{−(v−i)}−2E;
        END
END
```

$c \leftarrow 0; \quad k \leftarrow 0; \quad j \leftarrow 1;$

WHILE $(j \leq n)$ $\quad c \leftarrow c + \dfrac{n}{2^A};$ $\quad$ WHILE $(c \geq 1)$ $\quad\quad \tilde{U}_j \leftarrow \dfrac{k}{2^A}; \quad j \leftarrow j+1; \quad c \leftarrow c-1;$ $\quad$ END $\quad k \leftarrow k+1;$

END

FIG. 10

$C(0) \leftarrow 0;$

FOR $j = 1$ TO $2^A$ $\quad C(j) \leftarrow \left\lfloor \dfrac{j \cdot n}{2^A}; \right\rfloor - \sum_{k=0}^{j-1} C(k);$

END

FIG. 11

INFORMATION-THEORETICALLY SECURE SECRECY GENERATION

CROSS REFERENCE TO RELATED APPLICATIONS

This application claims the benefit of U.S. provisional application No. 61/052,333 filed May 12, 2008, which is incorporated by reference as if fully set forth.

FIELD OF INVENTION

This application is related to wireless communications.

BACKGROUND

In a typical wireless communication scenario two wireless transmit/receive units (WTRUs), Alice and Bob, communicate with each other on a channel. To exclude an eavesdropper, Eve, Alice and Bob cryptographically protect their communications. However, traditional cryptographic techniques, which rely on computational difficulty, are increasingly ineffective as the availability of computing power increases. Therefore, it would be advantageous to provide a cryptographic technique that is information-theoretically secure, rather than one based on computational difficulty.

SUMMARY

A method and apparatus are provided for performing information-theoretically secure cryptography using joint randomness not shared by others. Two valid communicating entities independently generate samples of a shared source that is not available to an illegitimate entity. The shared source may be a satellite signal, and each legitimate entity may generate uniformly distributed samples from a binary phase-shift keying signal received on an independent channel. Alternatively, the shared source may be a channel between the two legitimate entities, such that each legitimate entity generates samples of unknown distribution based on the channel impulse response of the channel. One legitimate entity generates an encryption key, a quantization error, and a syndrome from its samples. The quantization error and the syndrome are reported to the other legitimate entity. The other legitimate entity generates a matching encryption key using its samples, the quantization error, and the syndrome.

BRIEF DESCRIPTION OF THE DRAWINGS

A more detailed understanding may be had from the following description, given by way of example in conjunction with the accompanying drawings, wherein:

FIG. 6 shows an example of a method for universal shared secret key generation by Alice;

FIG. 7 shows an example of a method for universal shared secret key generation by Bob;

FIG. 10 shows an example of a method for generating uniformly distributed samples; and FIG. 11 shows an example of a method for computing a log-likelihood ratio.

DETAILED DESCRIPTION

When referred to hereafter, the term "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment. When referred to hereafter, the term "Alice" includes a WTRU or a base station that is a legitimate communicating entity. When referred to hereafter, the term "Bob" includes a WTRU or a base station that is a legitimate communicating entity. When referred to hereafter, the term "information-theoretically secure" includes but is not limited to perfectly secure, unconditionally secure, and nearly information-theoretically secure.

Figure 1:
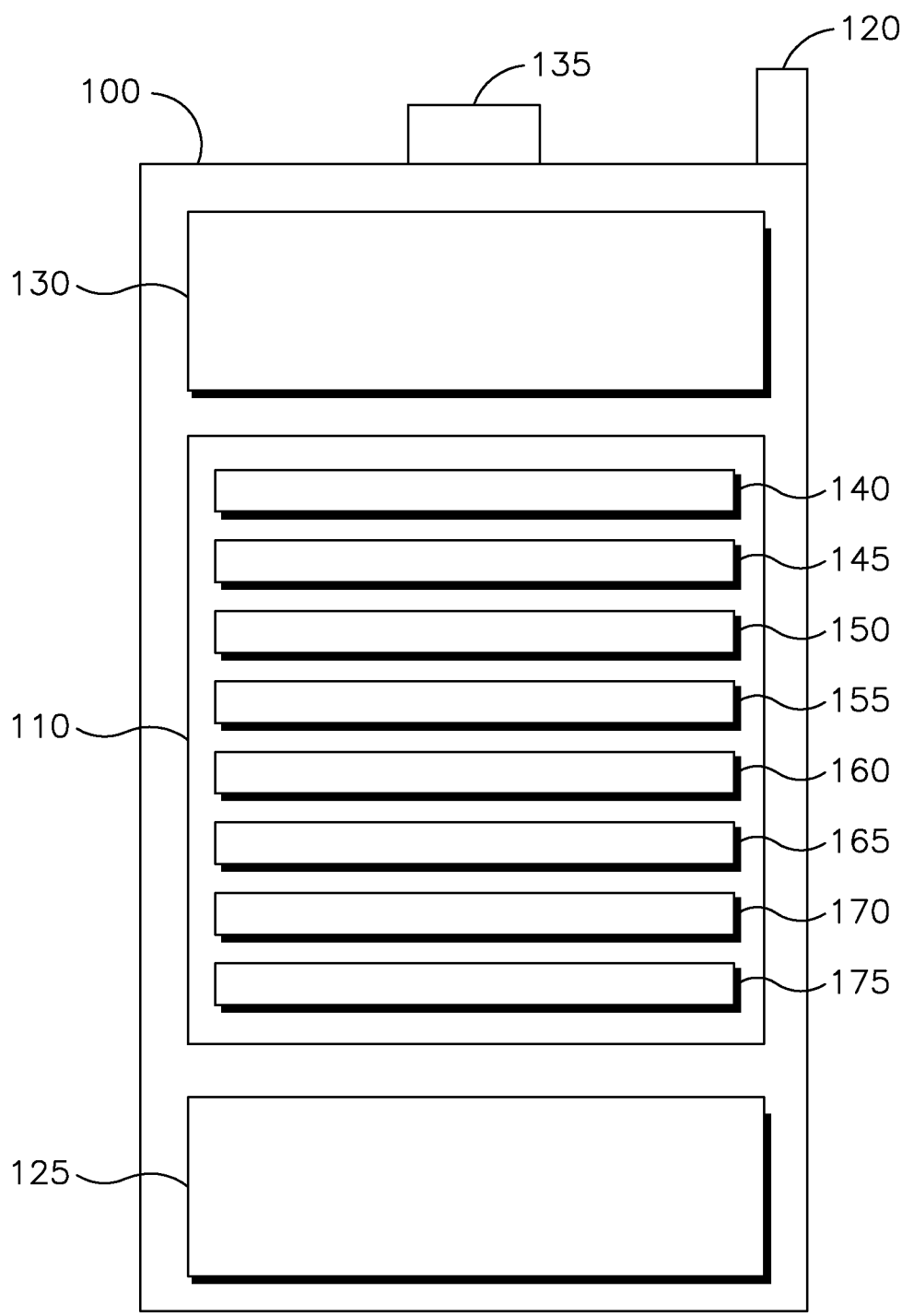
FIG. 1 shows an example block diagram of a wireless transmit/receive unit for performing wireless communications using joint randomness not shared by others.

FIG. 1 is an example block diagram of a wireless transmit/receive unit (WTRU) 100 for performing wireless communications using joint randomness not shared by others (JRNSO). The WTRU 100 includes a processor 110, an antenna 120, a user interface 125, a display 130, and a transceiver 135. Optionally, the transceiver may include a transmitter, a receiver, or a satellite receiver. The WTRU 100 also includes a channel estimator 140, a post processing unit 145, a data conversion unit 150, a quantization unit 155, a source coding unit 160, a channel coding unit 165, a decoding unit 170, and a privacy amplification (PA) processor 175. The configuration shown is for illustrative purposes. A WTRU may include only a subset of the elements described herein. For example, a particular embodiment of a WTRU 100 may only include a channel estimator 140, a post processing unit 145, a decoding unit 165, and a PA processor 170. The processor 110 is shown as including the channel estimator 140, the post processing unit 145, the data conversion unit 150, the quantization unit 155, the source coding unit 160, the channel coding unit 165, the decoding unit 170, and the privacy amplification (PA) processor 175 for illustration; however, one or more of these elements may be a separate unit.

Figure 2:
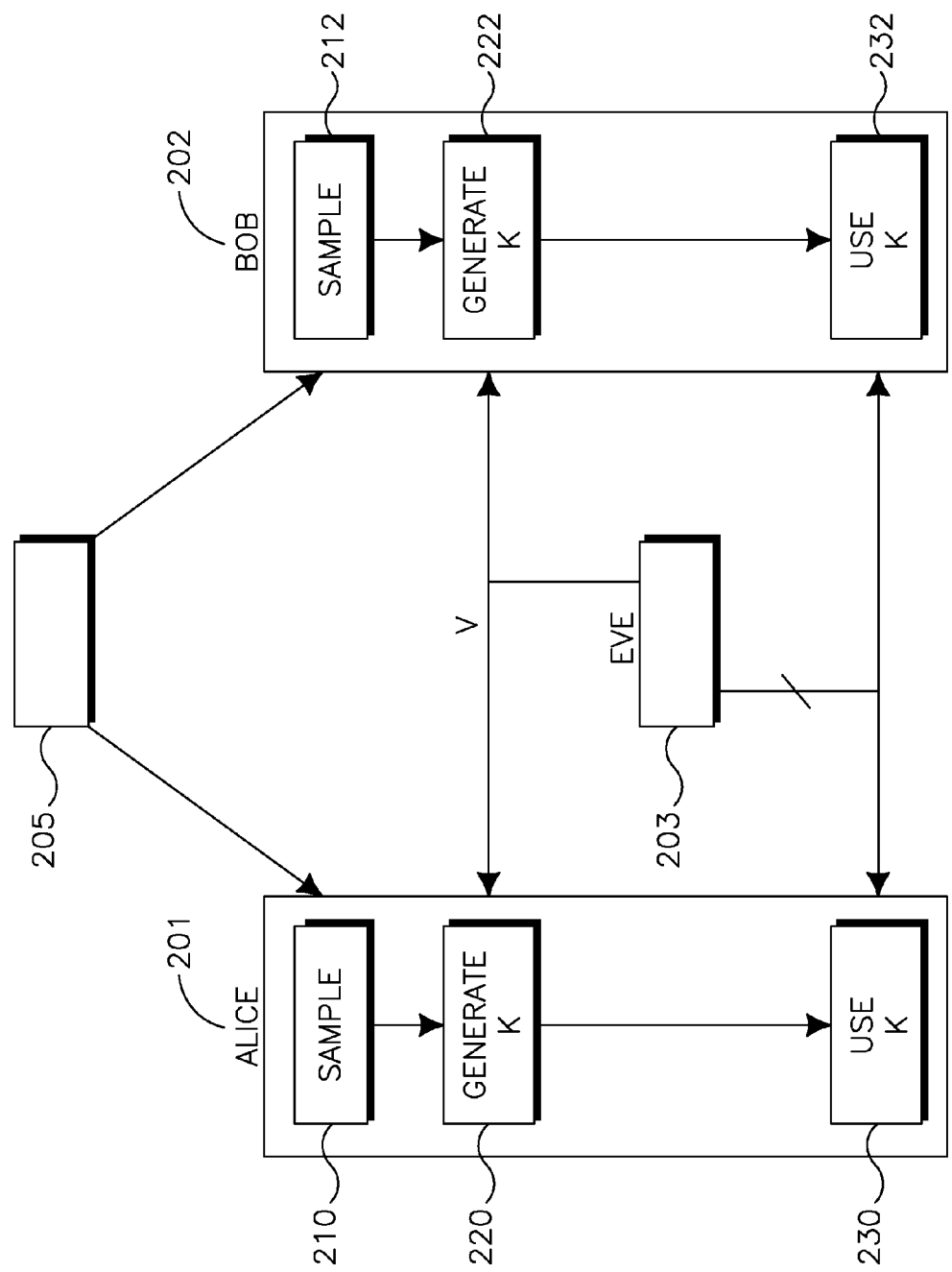
FIG. 2 shows an example block diagram of a network for performing wireless communications using joint randomness not shared by others with a source of uniformly distributed correlated random values.

FIG. 2 shows an example block diagram of a network 200 for performing wireless communications using joint randomness not shared by others (JRNSO) with a source of uniformly distributed correlated random values. The network 200 includes two legitimate WTRUs, Alice 201 and Bob 202, and an illegitimate eavesdropper, Eve 203. The network 200 also includes a source of uniformly distributed correlated random values 205. For example, the source may be a binary phase-shift keying (BPSK) satellite signal that is received by Alice 201 and Bob 202 through independent channels. Although Alice 201, Bob 202, and Eve 203 are shown individually, the communications may involve multiple legitimate and illegitimate entities.

Alice 201 and Bob 202 each generate input samples at 210, 212. The input samples are based on contemporaneous estimates of the source of uniformly distributed correlated random values 205 and is not available to Eve 203. Although Alice's channel is independent from Bob's, their estimates are highly correlated. The input samples taken by Alice 201 and Bob 202 may be expressed as $X^n$ and $Y^n$ respectively, where $X^n$ and $Y^n$ include n independent and identically distributed repetitions of the correlated random values X and Y, such that $X^n=(X_1, \ldots, X_n)$ and $Y^n=(Y_1, \ldots, Y_n)$. Where the distribution of the discrete random variable U is such that the probability that U=1 is equal to the probability that U=−1, and the distribution of the random values $Z_A$ and $Z_B$ is Gaussian, such that $N(0, N_A)$ and $N(0, N_B)$, the correlation between the random values X and Y may be expressed as $X=U+Z_A$ and $Y=U+Z_B$. The random values U, $Z_A$, and $Z_B$ are mutually independent. Although equal values of $N_A$ and $N_B$, and a signal to noise ratio (SNR) of 1/N, are used for simplicity herein, other values are applicable.

Alice 201 and Bob 202 communicate with each other over a public channel and each generates a shared secret key K, at 220, 222. The public keys are based on their respective input samples $X^n$, $Y^n$ and their public communications V. Alice 201 generates the bit string $K_A$ based on ($X^n$, V), and Bob 202 generates the bit string $K_B$ based on ($Y^n$, V). Where $\epsilon>0$ and κ is the finite range of the shared secret key K, the shared secret key K is uniformly distributed, such that $$\frac{1}{n}H(K) >= \frac{1}{n}\log|\kappa| - \varepsilon,$$

nearly statistically independent of V, such that $$\frac{1}{n}I(K; V) <= \varepsilon,$$

and is almost the same at Alice 201 and Bob 202, such that $Pr(K=K_A=K_B)>=1-\epsilon$. Alice 201 and Bob 202 use the shared secret key K to perform information-theoretically secure communications, at 230, 232.

Although Eve 203 may observe the public communications V, Eve 203 does not observe the signal 205 and cannot decrypt the information-theoretically secure communications between Alice 201 and Bob 202. For example, where Eve 203 does not have a receiver capable of receiving the signal, is out of range of the signal, does not know which signal to sample, or does not know the sampling time period, Eve 203 cannot receive the signal.

Figure 3:
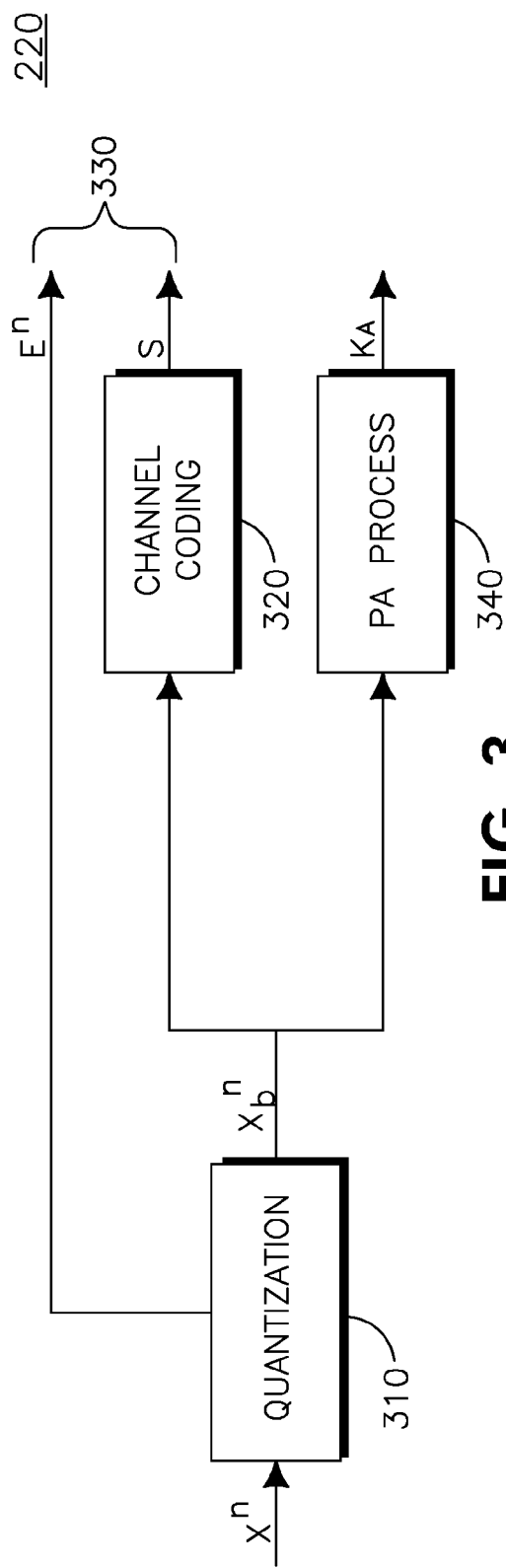
FIG. 3 shows an example of a method for shared secret key generation by Alice using uniformly distributed input samples.

FIG. 3 shows an example of a method for shared secret key generation 220 by Alice 201 using uniformly distributed input samples. The input samples $X^n$ are quantized, at 310. The quantization produces quantization values $X_b^n$, and quantization errors $E^n$. The quantization values $X_b^n$ are channel coded to generate syndrome bits S, in terms of a given block error correction code, at 320. The syndrome bits S and the quantization errors $E^n$ are transmitted through an error-free public channel to Bob 202, at 330. The publicly transmitted syndrome bits S include |S| bits of information, and the publicly transmitted quantization errors $E^n$ are independent of $X_b^n$.

Privacy amplification is performed on the quantization values $X_b^n$, at 340. The publicly revealed information is hashed out of the quantization values $X_b^n$, leaving perfectly secret bits for the shared secret key $K_A$. The probability density function (PDF) of X is an even function and the quantized values $X_b^n$ are a full entropy sequence, such that $H(X_b^n)=|X_b^n|$. Therefore, $X_b^n$ includes n bits of information and at least n"|S| perfectly secret bits are generated for the shared secret key $K_A$.

Quantization 310 includes identifying a partition, corresponding quanta, and quantization errors. Quantization produces quantization values $X_b^n$, and quantization errors $E^n$. Each quantized value $X_{b,i}$ includes the v bits corresponding to the v most significant values of the input, and the corresponding quantization error $E_i$ includes A−v bits corresponding to the remaining A−v least significant values of the input. Although equiprobable quantization is shown, any suitable quantization method may be applied.

The partition includes a set of disjoint intervals $Q_1 \ldots Q_v$, which cover the sample range. The quantization boundaries of each interval $Q_i$ is determined based on the samples. The corresponding quanta, which represent the quantized values, include a set of numbers $q_1 \ldots q_v$, such that $q_i \in Q_i$. Where a quantization level v which indicates the number of bits per quantization value and $0<=i<=2^v$, the determination of quantization boundaries may be expressed as $$q_i = \frac{i}{2^v}.$$

The quantization error $E^n$ may be expressed as $(E_i, \ldots, E_n)=(|X_1|, \ldots, |X_n|)$, and the generation of a quantized value uses a binary (single bit) quantizer and may be expressed as:

$$X_{b,i} = \begin{cases} 0, & X_i <= 0; \\ 1, & X_i > 0;. \end{cases} \quad \text{Equation (1)}$$

Figure 4:
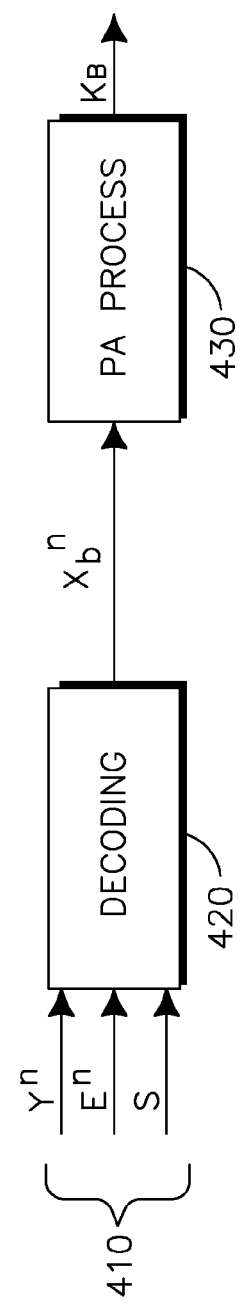
FIG. 4 shows an example of a method for shared secret key generation by Bob using uniformly distributed input samples.

FIG. 4 shows an example of a method for shared secret key generation 222 by Bob 202 using uniformly distributed input samples. The syndrome bits S and the quantization errors $E^n$ are received from Alice 201, at 410. The input samples $Y^n$ are decoded using the syndrome bits S and the quantization errors $E^n$ to produce the decoded samples $X_b^n$, at 420. Privacy amplification is performed on the decoded samples $X_b^n$ at 430.

Decoding 420 includes performing a modified belief-propagation algorithm to produce the decoded samples $X_b^n$. The modified belief-propagation algorithm includes calculating a per-bit log-likelihood ratio (LLR). The LLR is a logarithm of a ratio between the probability that $X_{b,i}$ is 0 and the probability that $X_{b,i}$ is 1. More generally, the LLR is related to the distances from V to the possible U values that cause $X_{b,i}$ to be 0 and that cause $X_{b,i}$ to be 1.

Where the inputs are based on a uniformly distributed binary signal, such as a BPSK modulated satellite signal, N is the noise power, $1<=i<=n$, $E_i=e$, and $Y_i=y$, the LLR (the uniform distribution LLR algorithm) may be expressed as:

$$X_{b,i} = \ln \frac{\exp\left(-\frac{(-e-1)^2}{2N} - \frac{(y-1)^2}{2N}\right) + \exp\left(-\frac{(-e+1)^2}{2N} - \frac{(y+1)^2}{2N}\right)}{\exp\left(-\frac{(e-1)^2}{2N} - \frac{(y-1)^2}{2N}\right) + \exp\left(-\frac{(e+1)^2}{2N} - \frac{(y+1)^2}{2N}\right)}. \quad \text{Equation (2)}$$

During privacy amplification 430 publicly revealed information is hashed out of the decoded samples $X_b^n$, leaving the perfectly secret bits for the shared secret key $K_B$. The PDF of X is an even function and the decoded samples $X_b^n$ are a full entropy sequence, such that $H(X_b^n)=|X_b^n|$. Therefore, the decoded samples $X_b^n$ include n bits of information and at least n−|S| perfectly secret bits are generated for the shared secret key $K_B$.

Figure 5:
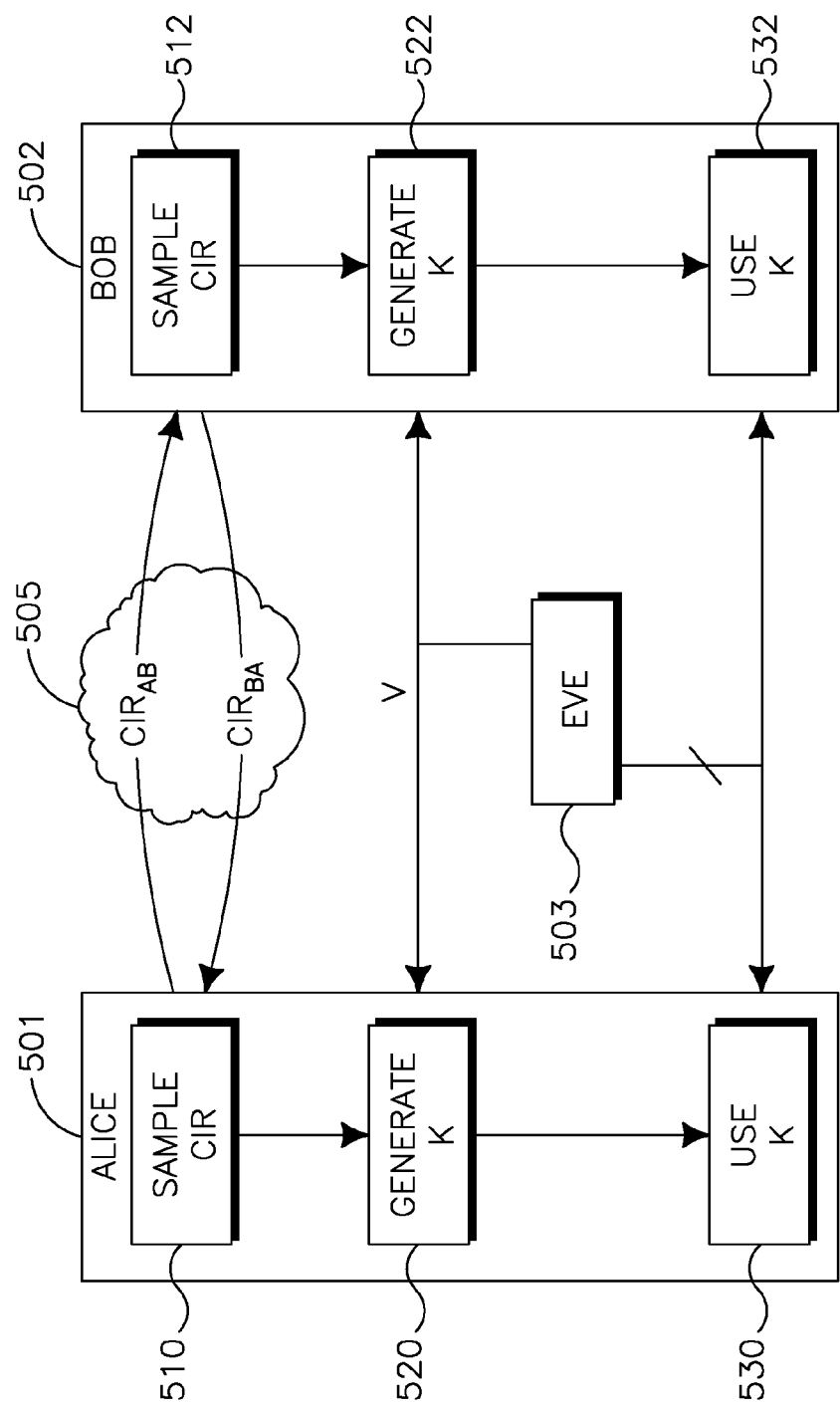
FIG. 5 shows an example block diagram of a network for performing wireless communications using joint randomness not shared by others using a reciprocal wireless channel.

FIG. 5 shows an example block diagram of a network 500 for performing wireless communications using JRNSO performed on a reciprocal wireless channel. The network 500 includes two legitimate WTRUs, Alice 501 and Bob 502, and an illegitimate eavesdropper, Eve 503. Although Alice 501, Bob 502, and Eve 503 are shown individually, the communications may involve multiple legitimate and illegitimate entities.

Alice 501 and Bob 502 each generate input samples, at 510, 512. The input samples are based on contemporaneous channel impulse response (CIR) measurements of their reciprocal wireless channel 505, which is not available to Eve 503. Due to channel reciprocity, the CIR estimates are composed of highly correlated samples of unknown distribution. Any two consecutive observations, at either Alice 501 or Bob 502, are independent if the time between observations is larger than the channel coherence time. The input samples taken by Alice 501 and Bob 502 may be expressed as $X^n$ and $Y^n$ respectively, where $X^n$ and $Y^n$ include n independent and identically distributed repetitions of the correlated random values X and Y, such that $X^n=(X_1, \ldots, X_n)$ and $Y^n=(Y_1, \ldots, Y_n)$.

Alice 501 and Bob 502 communicate with each other over a public channel and each generates a shared secret key K, at 520, 522. The shared secret keys K are based on their respective input samples $X^n$, $Y^n$ and their public communications V. Alice 501 generates the bit string $K_A$ based on $(X^n, V)$, and Bob 502 generates the bit string $K_B$ based on $(Y^n, V)$. Where $\epsilon>0$ and $\kappa$ is the finite range of the shared secret key K, the shared secret key K is uniformly distributed, such that $$\frac{1}{n}H(K) >= \frac{1}{n}\log|\kappa| - \varepsilon,$$

nearly statistically independent of V, such that $$\frac{1}{n}I(K; V) <= \varepsilon,$$

and is almost the same at Alice 201 and Bob 202, such that $Pr(K=K_A=K_B)>=1-\epsilon$. Alice 501 and Bob 502 use the shared secret key K to perform information-theoretically secure communications, at 530, 532.

Although Eve 503 may observe the public communications V, Eve 503 does not observe the shared reciprocal wireless channel 505 between Alice 501 and Bob 502, and cannot decrypt the information-theoretically secure communications between Alice 501 and Bob 502. For example, where Eve 503 is at least a few wavelengths away from Alice 501 and Bob 502, Eve's CIR measurements are not correlated with Alice's or Bob's.

FIG. 6 shows an example of a method for universal shared secret key generation 520 by Alice 501. The input samples $X^n$ are converted to uniformly distributed samples $U^n$, such that each uniformly distributed sample $U_i \in [0,1)$, at 605. Each uniformly distributed sample $U_i$ has a sample size of A, indicating A bits per sample. The uniformly distributed samples $U^n$ are quantized, at 610. The quantization produces quantization values $X_q^n$, and quantization errors $E^n$.

Quantization 410 includes identifying a partition, corresponding quanta, and quantization errors. Quantization produces quantization values $X_q^n$, and quantization errors $E^n$. Each quantized value $X_{q,i}$ includes the v bits corresponding to the v most significant values of the input, and the corresponding quantization error $E_i$ includes A−v bits corresponding to the remaining A−v least significant values of the input. Although equiprobable quantization is shown, any suitable quantization method may be applied.

The partition includes a set of disjoint intervals $Q_1 \ldots Q_v$, which cover the sample range. The quantization boundaries of each interval $Q_i$ is determined based on the samples. The corresponding quanta, which represent the quantized values, include a set of numbers $q_1 \ldots q_v$, such that $q_i \in Q_i$. Where a quantization level v which indicates the number of bits per quantization value and $0<i<=i2^v$, the determination of quantization boundaries may be expressed as $$q_i = \frac{i}{2^v}.$$

Where the inputs are fixed point inputs, such as the uniformly distributed samples $U^n$, and v is less than A, the quantized value $X_{q,i}$ is the v most significant bits in $U_i$, and the quantization error $E_i$ is the remaining A−v least significant bits in $U_i$.

The quantization values $X_q^n$ are source coded into bit strings $X_b^n$, at 615. For example, gray coding may be used to convert $X_q^n$ to $X_b^n$. The source coded bit strings $X_b^n$ are channel coded to generate syndrome bits S. Block Error Correction Coding is applied $X_b^n$ to generate syndrome bits S, in terms of a given low density parity code (LDPC), at 620. The syndrome bits S and the quantization errors $E^n$ are transmitted through an error-free public channel to Bob 502, at 630. The publicly transmitted syndrome bits S include |S| bits of information, and the publicly transmitted quantization errors $E^n$ are independent of $X_b^n$. The publicly revealed information is hashed out of the common bit string $X_b^n$, leaving perfectly secret bits for the shared secret key $K_A$, at 640.

FIG. 7 shows an example of a method for universal shared secret key generation 522 by Bob 502. The input samples $Y^n$ are converted to uniformly distributed samples $V^n$, such that each uniformly distributed sample $V_i \in [0,1)$, at 705. The syndrome bits S and the quantization errors $E^n$ are received from Alice 501, at 710. The uniformly distributed samples $V^n$ are decoded using the syndrome bits S and the quantization errors $E^n$ to produce the decoded samples $X_b^n$, at 720. The publicly revealed information is hashed out of the decoded samples $X_b^n$, leaving the perfectly secret bits for the shared secret key $K_B$, at 730.

Figures 8, 9:
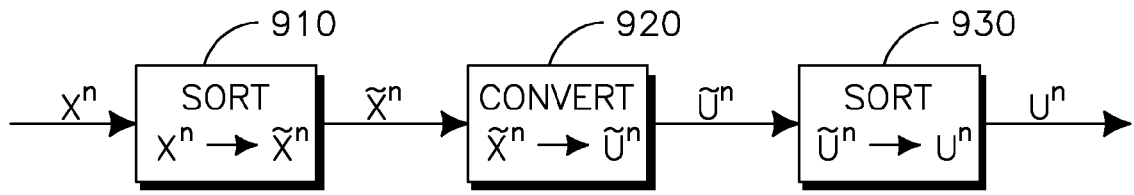
FIG. 8 shows an example of a rate-matching method.
FIG. 9 shows an example of a method for converting input samples of unknown distribution to uniformly distributed samples.

Decoding 720 includes performing a modified belief-propagation algorithm to produce the decoded samples $X_b^n$. The modified belief-propagation algorithm includes calculating a per-bit log-likelihood ratio (LLR). The LLR is a logarithm of a ratio between the probability that $X_{b,i}$ is 0 and the probability that $X_{b,i}$ is 1. More generally, the LLR is related to the distances from V to the possible U values that cause $X_{b,i}$ to be 0 and that cause $X_{b,i}$ to be 1.

Where $1<=i<=v$, the LLR $L_i$ for $X_{b,i}$ may computed using an unknown distribution LLR algorithm as shown in FIG. 8. For example, where the quantization error $E_i$ is 0.2 and the number of bits per quantized value v is 1, either U is 0.2 and $X_{b,1}$ is 0 or U is 0.7 and $X_{b,1}$ is 1. The value of U that is closer to V represents the more likely value of $X_{b,1}$. Where V is 0.3, $X_{b,1}$ is 0 and the LLR for $X_{b,1}$ is positive. Similarly, where V is 0.5, $X_{b,1}$ is 1 and the LLR for $X_{b,1}$ is negative. Therefore, the LLR $L_1$ is −0.1. Optionally, $L_i$ may be scaled to the operational range of the modified belief-propagation algorithm by multiplying $L_i$ with a constant.

FIG. 9 shows an example of a method for converting input samples of unknown distribution to uniformly distributed samples. For simplicity, the conversion is described in reference to Alice's input samples $X^n$; however, one skilled in the art would recognize that the method may be applied to Bob's input samples $Y^n$.

The input samples $X^n$ are sorted according to the observed value of each input sample $X_i$, at 910. For example, the values $X_i$ may be sorted in ascending order such that $\tilde{X}_1 <= \ldots <= \tilde{X}_n$. Each sorted sample $\tilde{X}_i$ retains an association with the pre-sort index of the corresponding input sample $X_i$. The sorted samples $\tilde{X}^n$ are converted (transformed) into sorted uniformly distributed samples $\tilde{U}^n$, at 920. The sorted uniformly distributed samples $\tilde{U}^n$ are sorted into uniformly distributed samples $U^n$ by sorting each sorted uniformly distributed sample $\tilde{U}_i$ according to the index of the corresponding input samples $X_i$, at 930. The resultant uniformly distributed samples $U^n$ are inherently fixed-point values.

The conversion, which is based on an empirical distribution of the input samples, associates the sorted sample $\tilde{X}_i$ with the sorted uniformly distributed sample $\tilde{U}_i$. For example, the conversion is performed using a rate-matching method as shown in FIG. 10. Where $X_i$ indicates the $i^{th}$ sample of the input samples $X^n$, $F(X_i)$ indicates the number of samples in $X^n$ that are less than the input sample $X_i$ added to the number of samples in the input samples $X^n$ that are equal to $X_i$ and have an index less than i. The corresponding uniformly distributed sample $U_i$ may be expressed as:

$$U_i = \frac{F(X_i)}{n}. \qquad \text{Equation (3)}$$

Where $0<=j<=2^A-1$, the value of a uniformly distributed sample $U_i$ may be expressed as $$\frac{j}{2^A}.$$

Where $0<=j<=2^A$, the C(j) uniformly distributed samples have a value of $$\frac{j-1}{2^A}.$$

Where $\lfloor x \rfloor$ is the largest integer less than x, the uniformly distributed samples $U_i$ in C(j) may be generated as shown in FIG. 10. Thus, the uniformly distributed sample $U_i$ corresponding to an input sample $X_i$ may be expressed as $$\frac{k}{2^A}$$

where the input sample $X_i$ may be expressed as:

$$\sum_{j=0}^{k} C(j) \leq F(X_i) < \sum_{j=0}^{k-1} C(j). \qquad \text{Equation (4)}$$

Although conversion has been shown in terms of $2^A$ for simplicity, any integer number of values may be converted such that the unit interval [0,1) is partitioned into equal sub-intervals with the data distributed among them as uniformly as possible.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method of performing information-theoretically secure wireless communication, the method comprising:
    receiving, at a first wireless transmit/receive unit (WTRU), a signal comprising uniformly distributed correlated random values, wherein the signal is also available to a second WTRU, and wherein the signal is received from a device that is not the first WTRU or the second WTRU;
    generating, at the first WTRU, a plurality of input samples from the signal;
    deriving, at the first WTRU, an information-theoretically secure cryptographic key using the plurality of input samples and communications exchanged between the first WTRU and the second WTRU over a public communications channel, wherein the deriving comprises conversion comprising:
        sorting the plurality of input samples to produce a plurality of ordered samples and assigning each ordered sample an index corresponding to a corresponding input sample of the plurality of input samples,
        transforming the plurality of ordered samples to generate a plurality of uniformly distributed ordered samples, and
        resorting the plurality of uniformly distributed ordered samples based on the assigned index of each of the uniformly distributed ordered samples to produce a plurality of uniformly distributed samples; and
    the first WTRU establishing a communications session with the second WTRU using the cryptographic key.

2. The method of claim 1, wherein the deriving includes privacy amplification.

3. The method of claim 1, wherein the transforming includes rate-matching.

4. The method of claim 1, wherein the deriving includes decoding.

5. The method of claim 4, wherein the decoding includes:
receiving a public component of the plurality of input samples from the second WTRU on the public communications channel; and
applying a modified belief-propagation algorithm on the plurality of input samples.

6. The method of claim 5, wherein applying the modified belief-propagation algorithm includes calculating a log-likelihood ratio (LLR) of the plurality of input samples.

7. The method of claim 6, wherein calculating the LLR includes performing a uniform-distribution LLR algorithm.

8. The method of claim 6, wherein calculating the LLR includes performing an unknown-distribution LLR algorithm.

9. The method of claim 1, wherein the deriving includes encoding.

10. The method of claim 9, wherein encoding includes reporting a public component of the plurality of input samples to the second WTRU on the public communications channel.

11. The method of claim 10, wherein the encoding includes quantization and channel coding.

12. The method of claim 11, wherein the quantization includes producing a quantization value and producing a quantization error.

13. The method of claim 12, wherein the producing a quantization value includes using a binary quantizer.

14. The method of claim 12, wherein the producing a quantization error includes calculating an absolute value of a corresponding random value.

15. The method of claim 12, wherein the producing a quantization value includes selecting a predetermined number of most significant bits of a corresponding random value.

16. The method of claim 12, wherein the producing a quantization error includes selecting a predetermined number of least significant bits of a corresponding random value.

17. The method of claim 12, wherein the reporting a public component includes transmitting the quantization error.

18. The method of claim 12, wherein the channel coding includes generating a syndrome.

19. The method of claim 18, wherein the reporting a public component includes transmitting the syndrome.

20. The method of claim 19, wherein the encoding includes source coding.

21. The method of claim 20, wherein the source coding includes grey coding.

22. A wireless transmit/receive unit (WTRU), the WTRU comprising:
a processor configured to:
generate a plurality of input samples from a signal comprising uniformly distributed correlated random values; and
derive an information-theoretically secure cryptographic key using the plurality of input samples and communications exchanged between the WTRU and a second WTRU over a public communications channel, wherein the deriving comprises conversion comprising:
sorting the plurality of input samples to produce a plurality of ordered samples and assigning each ordered sample an index corresponding to a corresponding input sample of the plurality of input samples,
transforming the plurality of ordered samples to generate a plurality of uniformly distributed ordered samples, and
resorting the plurality of uniformly distributed ordered samples based on the assigned index of each of the uniformly distributed ordered samples to produce a plurality of uniformly distributed samples; and
a transceiver configured to:
exchange the communications between the WTRU and a second WTRU over the public communications channel;
receive the signal comprising the uniformly distributed correlated random values, wherein the signal is also available to the second WTRU, and wherein the signal is received from a device that is not the first WTRU or the second WTRU; and
communicate with the second WTRU using the information-theoretically secure cryptographic key.

23. The WTRU of claim 22, wherein the processor includes a privacy amplification processor configured to remove a public component from the plurality of input samples.

24. The WTRU of claim 22, wherein the data conversion unit is configured to transform using rate-matching.

25. The WTRU of claim 22, wherein the processor includes a decoding unit configured to:
receive a public component of the plurality of input samples from the WTRU on the public communications channel; and
apply a modified belief-propagation algorithm to the plurality of input samples.

26. The WTRU of claim 25, wherein the decoding unit is configured to calculate a log-likelihood ratio (LLR) of the plurality of input samples for use in the modified belief-propagation algorithm.

27. The WTRU of claim 26, wherein the decoding unit is configured to calculate the LLR using a uniform-distribution LLR.

28. The WTRU of claim 26, wherein the decoding unit is configured to calculate the LLR using an unknown-distribution LLR.

29. The WTRU of claim 22, wherein the processor includes:
a quantization unit configured to produce a quantization value and a quantization error; and
a channel coding unit configured to generate a syndrome.

30. The WTRU of claim 29, wherein the transceiver is configured to report the quantization error and the syndrome to the second WTRU on the public communications channel.

31. The WTRU of claim 29, wherein the quantization unit is configured to produce a quantization value using a binary quantizer.

32. The WTRU of claim 29, wherein the quantization unit is configured to produce a quantization error by calculating an absolute value of a corresponding random value.

33. The WTRU of claim 29, wherein the quantization unit is configured to produce a quantization value by selecting a predetermined number of most significant bits of a corresponding random value.

34. The WTRU of claim 29, wherein the quantization unit is configured to produce a quantization error by selecting a predetermined number of least significant bits of a corresponding random value.

35. The WTRU of claim 29, wherein the processor includes a source coding unit configured to convert the quantization value to a bit string.

36. The WTRU of claim 35, wherein the source coding unit is configured to convert using grey coding.

* * * * *